United States Patent [19]

Furacz

[11] 4,151,820
[45] May 1, 1979

[54] CARBURETION SYSTEM FOR INTERNAL COMBUSTION MOTOR

[76] Inventor: Istvan Furacz, 3964 St. Denis St., App. 12, Montreal, Quebec, Canada, H2W 2M2

[21] Appl. No.: 843,952

[22] Filed: Oct. 20, 1977

[51] Int. Cl.² ............................................. F02M 13/06
[52] U.S. Cl. .............................. 123/127; 123/122 AB; 123/122
[58] Field of Search ................. 123/122 AB, 122 AA, 123/122 A, 122 R, 139 BG, 127, 52 MV, 121, 59 PC, 179 G; 261/23 A, 39 D

[56] References Cited

U.S. PATENT DOCUMENTS

| | | | |
|---|---|---|---|
| 2,145,863 | 2/1939 | Curioni | 261/23 A |
| 3,549,132 | 12/1970 | Haase | 261/23 A |
| 3,826,234 | 7/1974 | Cinquegresi | 123/139 BG |

Primary Examiner—Ronald H. Lazarus
Attorney, Agent, or Firm—Swabey, Mitchell, Houle, Marcoux & Sher

[57] ABSTRACT

The disclosure describes a carburetion system for an internal combustion motor which operates with a mixture of vapor fuel and air. The system comprises: a carburetor which is characterized by operating as a continuous injection system, and a removeable heat exchanger which is incorporated into the admission system before the exhaust system, in order to heat the admission system. The carburetor is supplied under constant pressure through a pressure regulator which enables to vary the pressure of the fuel depending on the operating conditions and the behavior of the motor in general; moreover, the carburetor is provided with automatic control means to regulate the proportion of the quantities of air which accompany the formation of vapor fuel and the heat exchanger; finally, this system enables to limit the premature expansion of the combustible mixture which is introduced into the combustion chambers.

5 Claims, 18 Drawing Figures

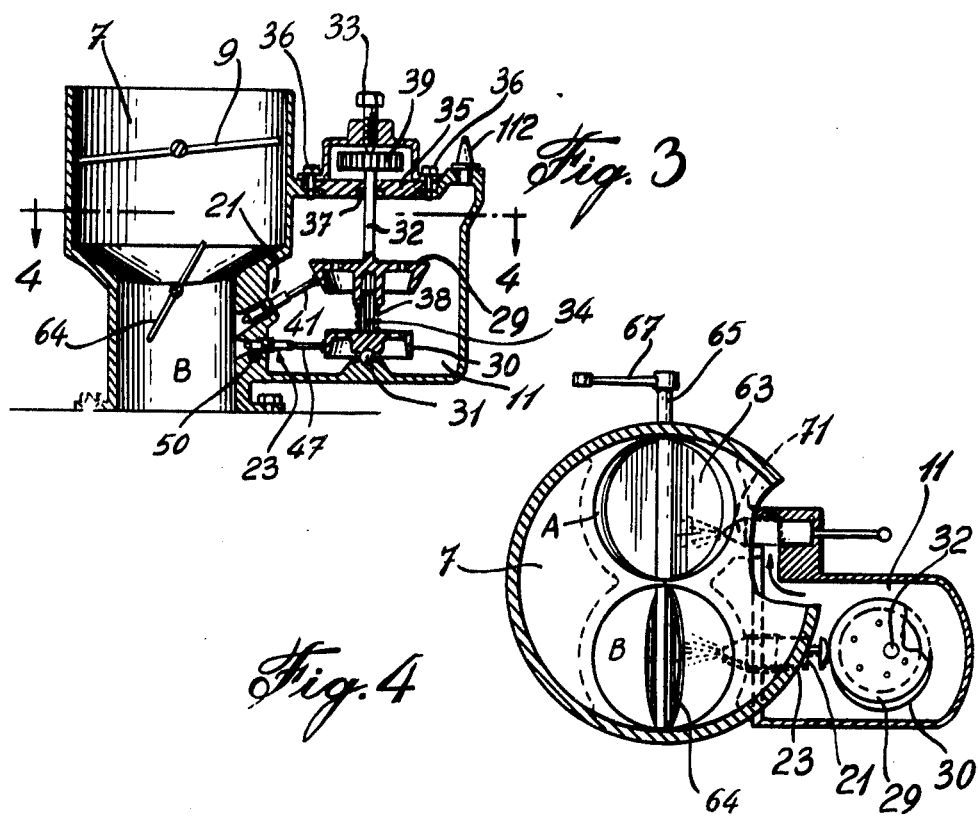
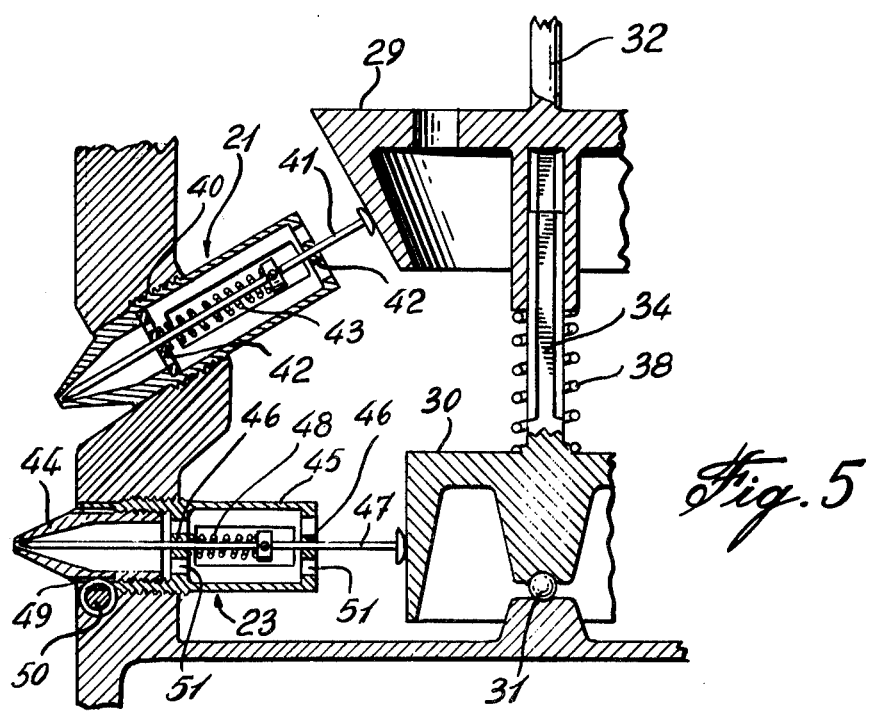

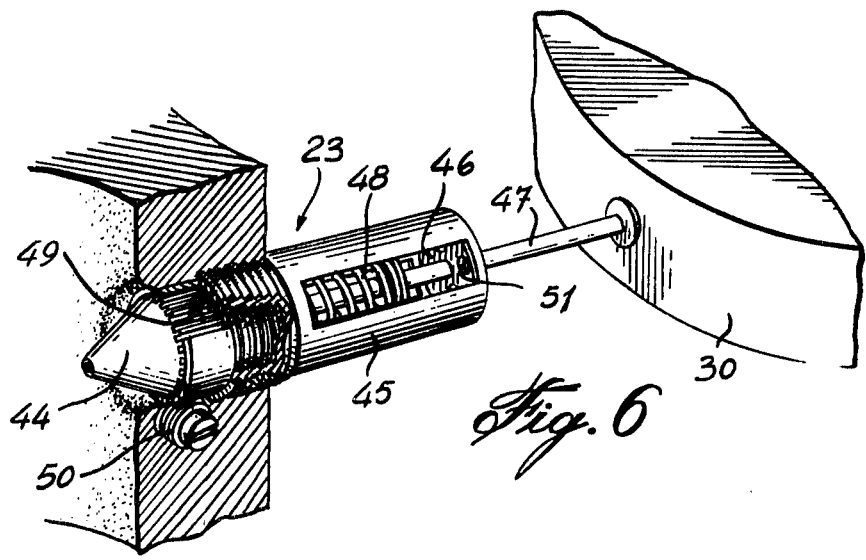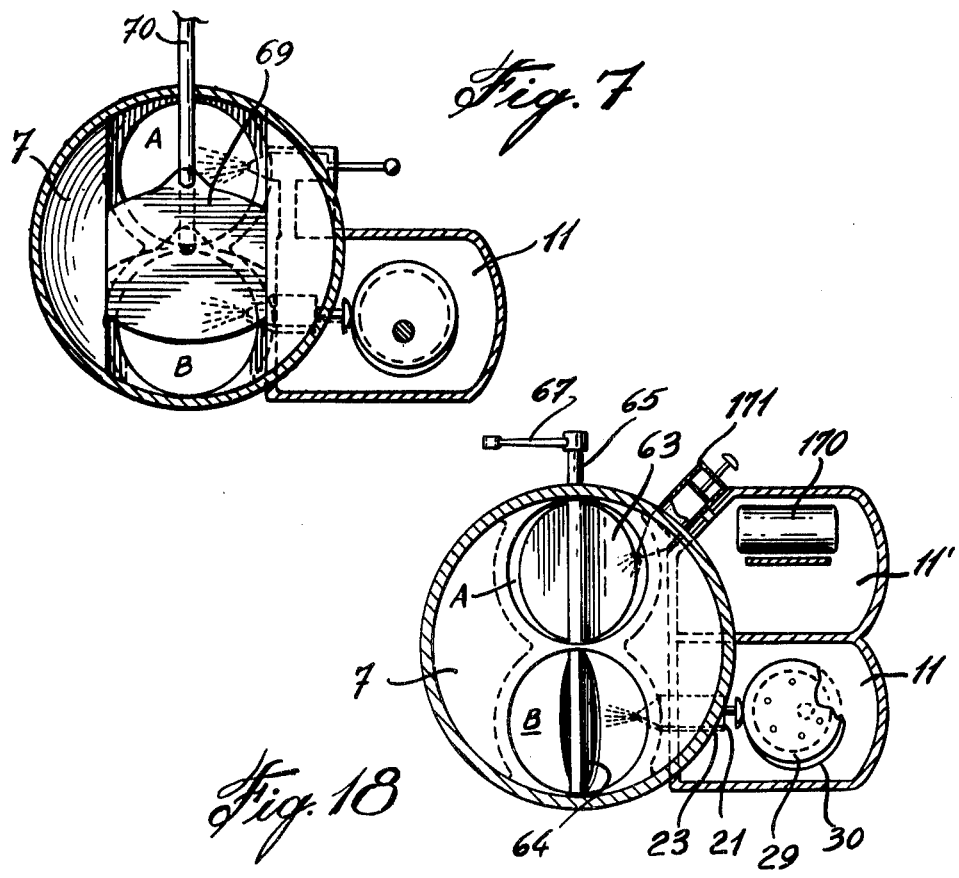

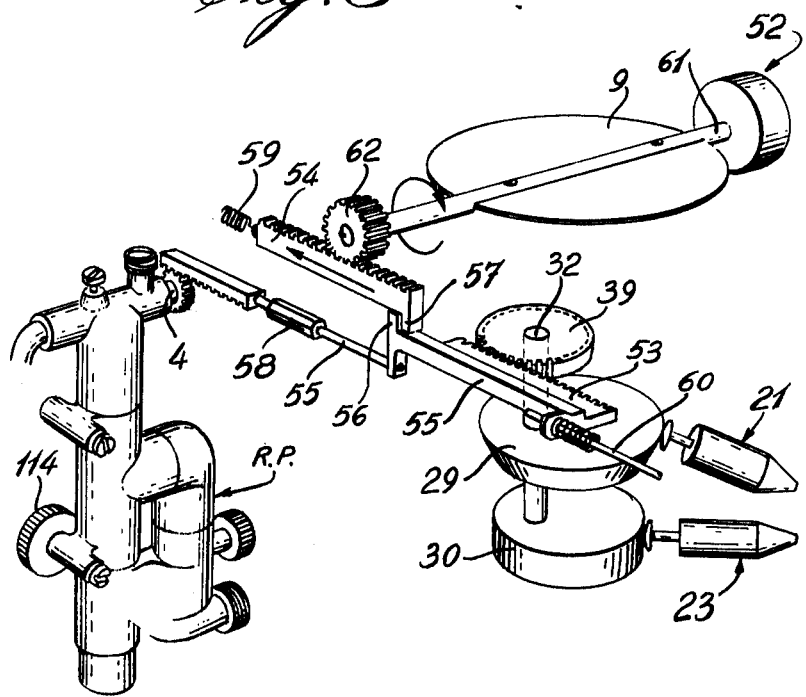
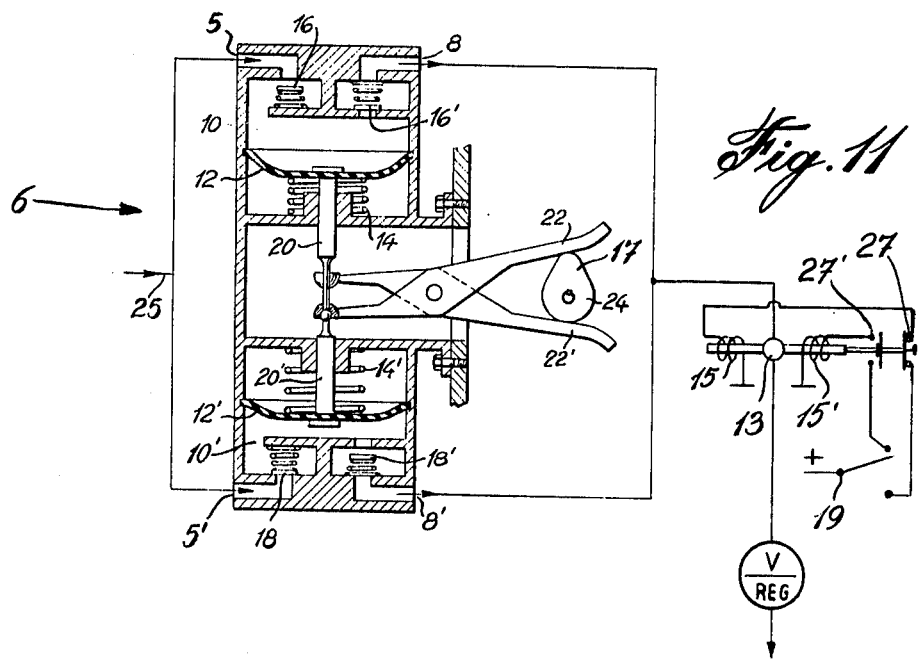

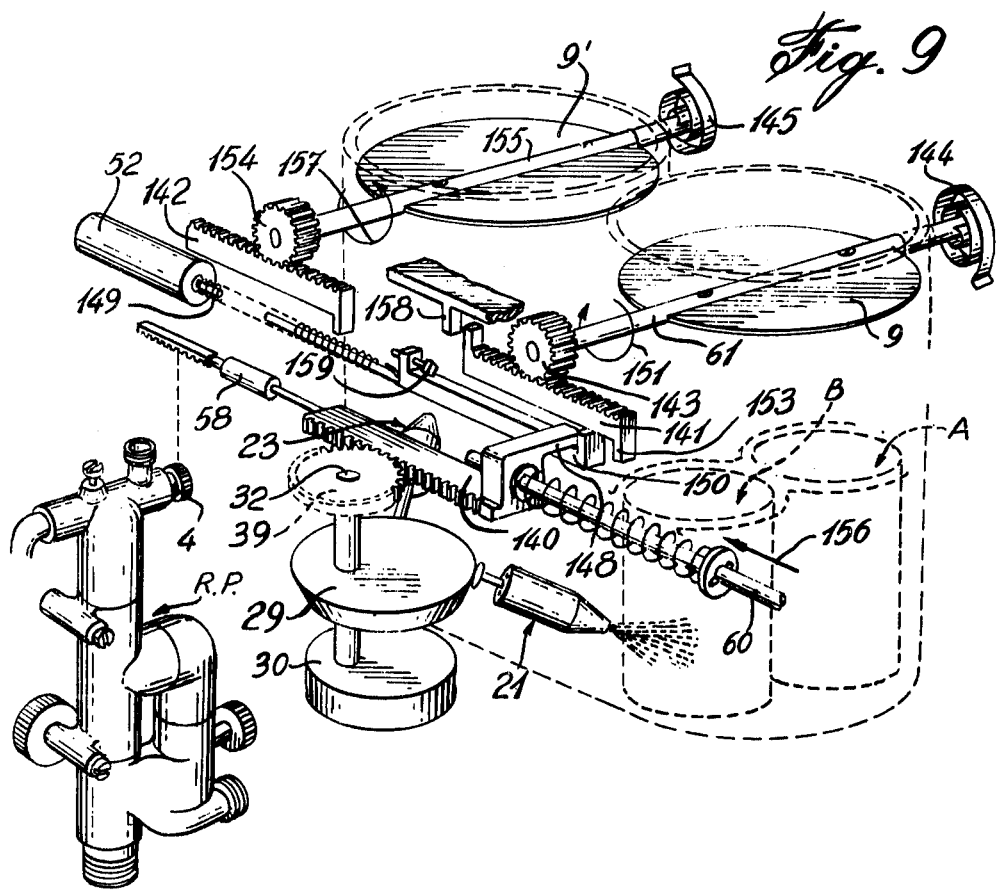
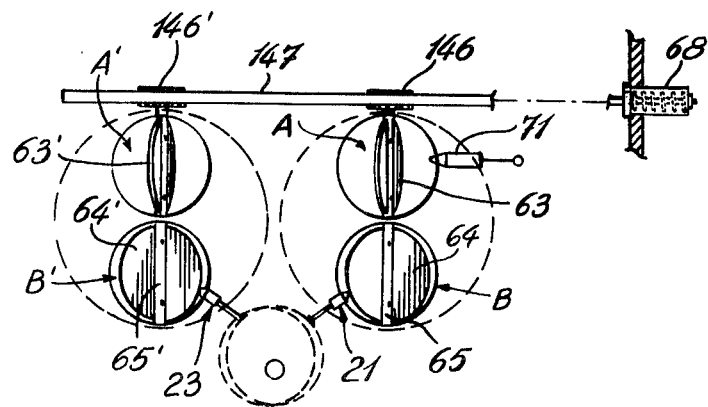

CARBURETION SYSTEM FOR INTERNAL COMBUSTION MOTOR

The present disclosure concerns an improvement to my invention entitled: "A carburetion system for an internal combustion motor", described in Canadian Pat. No. 975,232. It can be adapted for use with any motor of this kind, whatever the number and size of the cylinders.

In general, the principle upon which the system according to my invention is based, consists in utilizing the energy of the heat which is released by the motor itself, more specifically by the exhaust gases, in order to convert the hydrocarbon into vapour between the carburetor and the admission to the motor cylinders. In this matter, the mixture of motor fuel vapour and air which penetrates into the cylinders where the explosion takes place, is very efficient.

According to the above principle, an object of my invention is, therefore to provide a device enabling to improve the carburetion of the internal combustion engines in order to obtain a substantial reduction of the fuel, while preserving the original performances of the engine.

Another object of the invention consists of substantially decreasing the pollution caused by carbon monoxide and other toxic debris while obtaining an improved combustion of the fuel.

An additional object resides in the fact that the system of carburetion according to my invention, allows a reduction in the wear of the mechanical pieces of the engine which for a good part is caused by particles of debris which are formed by incompletely burnt or unburnt fuel and are carried by the lubricating oil of the engine.

In a real effort to establish the true value of my invention, the description which follows, brings about many solutions to some major problems, directly resulting from the operation of my carburetion system.

In a few preliminary words, the carburetion system which I propose operates with a mixture of vapour fuel and air, in a volume ratio which is relatively constant for any conditions under which the engine operates.

The system is equipped with a carburetor which has the operating characteristic of an injection system. This carburetor, in its most simple aspect, has one single carburetion chamber and a fuel reservoir, said carburetion chamber being provided with means to control the admission of air.

The carburetion chamber, below the means to control the admission of air is divided, according to a predetermined dimension ratio, thus forming two compartments which are independent of one another, each having a different function, but both acting together to make sure that the carburetion takes place.

The reservoir of the carburetor is supplied by a fuel pump under constant pressure through an adjustable pressure regulator, enabling to vary the pressure inside said reservoir.

The pressure regulator is connected to automatic control means enabling to adjust the regulator and to automatically readjust the fuel pressure inside the reservoir of the carburetor, depending on the operating conditions and the behaviour of the motor in general; finally, the pressure regulator enables to obtain rational distribution of the fuel. Consequently, for a given pressure and independently of the pressure decreased exerted by the motor cylinders on the carburetion chamber, the flow of fuel is regulated by adjusting the opening of valves mounted on said reservoir of the carburetor, or communicating with the latter.

Two variable fuel flow valves feed the first of the two compartments of the carburetion chamber, said valves being adapted to supply the necessary quantity of fuel for any conditions under which the engine operates.

The first of these valves ensures the flow of fuel for idling and up to an average speed of the engine, and the second valve will start to operate when the engine will be requested to rotate above the average speed up to the maximum speed.

Finally, the valve operating intermittently, manually or automatically, feeds into the second compartment of the carburetion chamber. This valve will supply the excess of fuel necessary to start the motor when the latter is cold.

A mechanism automatically adjusts the opening of these means to control the admission of air with respect to the opening of the variable fuel flow valves in order that for a given pressure, said mechanism makes sure that the carburetion chamber produces a flow mixture of fuel and air under constant volume ratio for any conditions under which the motor operates.

A heat exchanger is connected downstream of said carburetor, the two being separated by a high performance thermic insulator, said heat exchanger comprising a body provided with a heat exchange duct, connecting said first compartment of the carburetion chamber to the motor cylinders.

Means are provided to bring the combustion gases around said heat exchange duct to heat the heat exchanger, in order that the fuel which is fed by the two variable fuel flow valves, during its passage in said duct, can be converted into vapour.

The body of said heat exchanger is unitary and removeable in order to be easily removed to exchange it or to carry out a periodic cleaning.

Finally, an unheated passage connects said second compartment of the carburetion chamber with the motor cylinders.

An automatic control mechanism adjusts the position and the action of said control means depending on the temperature of the fuel mixture at the entrance of the motor cylinders.

The invention relates to a carburetion system for internal combustion motor operating with a mixture of fuel and air, said carburetion system comprising:

a carburetor having at least one carburetion chamber into which fuel is injected under pressure;

a heat exchanger below said carburetor being incorporated in an admission system and in an exhaust system to heat the fuel with exhaust gases, in order to enable the fuel supplied by the carburetor to evaporate in said heat exchanger during its passage therein towards motor cylinders;

means for feeding into said carburetor a mixture of fuel and air under constant pressure through a controlled pressure regulator said pressure regulator enabling to vary the pressure of fuel depending on the operating conditions and behaviour of the engine;

at least one variable fuel flow valve feeding fuel into said carburetion chamber to supply the fuel required for all operating conditions of the motor, the quantity of fuel injected into the carburetion chamber being regulated by adjusting opening of said valve and by means of said pressure regulator;

means supplying a larger quantity of fuel to help in starting the motor until said heat exchanger is sufficiently hot to be operative;

control means to regulate the proportion of air associated with vapor fuel in said heat exchanger with respect to non heated air which is directly fed towards the motor cylinders, in order to limit the extent of premature dilatation of the combustible mixture which is introduced into the motor cylinders;

means to provide air fuel mixtures under ideal volume ratios for any operating conditions of the motor;

control means to shut off the flow of fuel injected by the variable fuel flow valve into the carburetion when slowing down until the r.p.m. is stabilized.

Other characteristics of the invention will appear from the description which follows of a practical embodiment, given only by way of example and without limitation, this description referring to the drawings, in which:

FIG. 3 is a vertical cross-section of the carburetor, along a plane passing through line 3—3 of FIG. 1;

FIG. 4 is a horizontal cross-sectional view of the carburetor along a plane passing through line 4—4 of FIG. 3;

FIG. 5 is a cross-sectional view with construction details and illustrating in blow-up proportions the assembly of the mechanism which is responsible for the distribution of the fuel;

FIG. 6 is a perspective view of a variable fuel flow valve, partially cut away to illustrate its interior;

FIG. 7 is a perspective view of the control means for regulating the proportion of the quantities of air which pass in one or the other compartment of the carburetion chamber;

FIG. 8 is a perspective view of a mechanism which permits the distribution of the combustible mixture, intended for the carburetor illustrated in FIG. 1;

FIG. 9 is a perspective view of a mechanism which is responsible for the distribution of the combustible mixture intended for an improved carburetor, provided with two carburetion chambers;

FIG. 10 is a plan view illustrating the control means for regulating the proportions of the quantities of air which pass in one or the other compartment of each carburetion chamber of the improved carburetor;

FIG. 11 is a schematic illustration of a fuel pump and of the supply circuit of the reservoir of the carburetor;

FIG. 18 is another horizontal plane sectional view of the carburetor along a plane passing through line 4—4.

Figure 1:
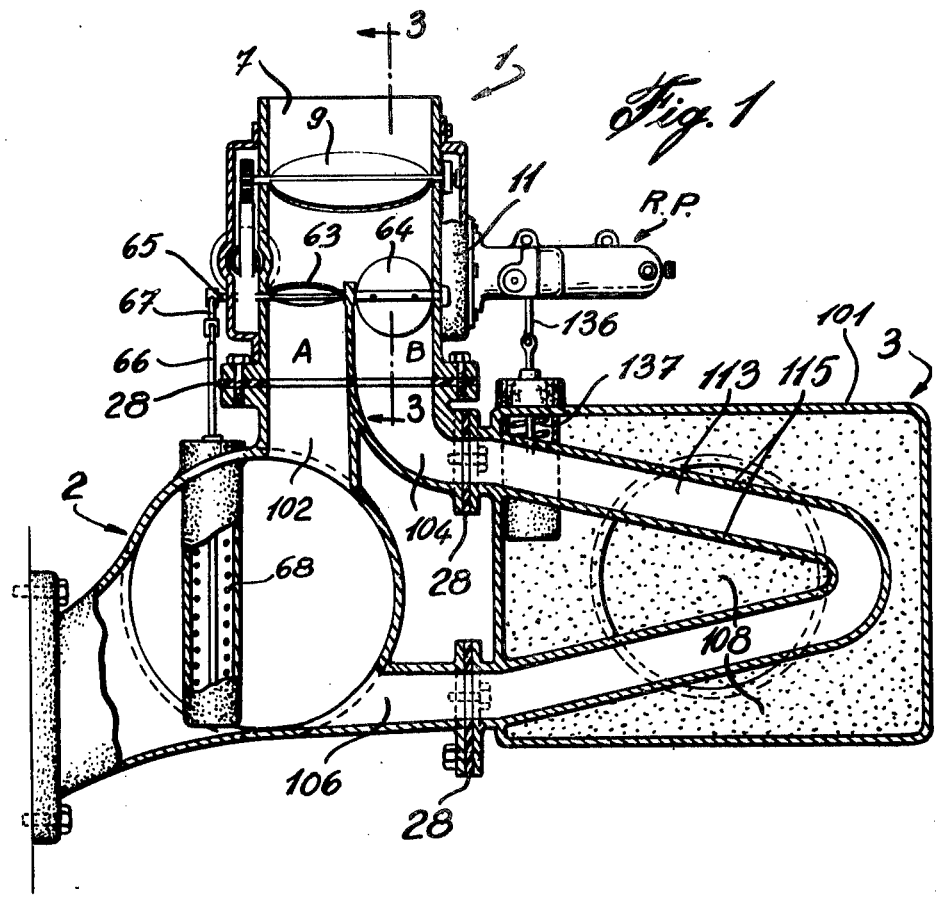
FIG. 1 is a vertical cross-section of a carburetion system according to my invention, showing its operation.

I will, first of all, refer to FIG. 1, illustrating the assembly of the carburetion system according to my invention, which comprises a carburetor 1, mounted in a known manner, between an air filter, not illustrated, and above the admission system 2, and a heat exchanger 3, which forms part of the system.

The body of the carburetor 1, in its most simple aspect, has a carburetion chamber 7 and a reservoir 11. The carburetion chamber 7 is provided with a butterfly valve 9 controlling the admission of air.

The carburetion chamber 7, downstream of the butterfly valve 9 is divided according to a predetermined dimension ratio, thus forming two compartments A and B, which are independent of one another and will each have a different purpose.

The upper part of the admission system 2 where the carburetor 1 is mounted, is provided with two adjacent openings, each corresponding with a passage: the first opening corresponds with passage 102 which directly opens in the admission system 2 and the second opening corresponds to the passage 104 which branches off towards the outside, thus being in contiguous position with the first section of the duct 113 of the heat exchanger 3. The last section of the duct 113 is connected with the passage 106 made in the upper part of the admission system 2.

Referring again to FIG. 1, the carburetor 1 which is separated by a thermic insulator 28, is fixedly mounted on the admission system 2 in order that the openings of the passages 102 and 104 be in contiguous position, respectively with the compartments A and B of the carburetion chamber 7.

I now refer to FIG. 2, which is illustrated in connection with a four cylinder linear motor, but it will be understood that this figure and the description which will follow constitute a non-limiting example.

Figure 2:
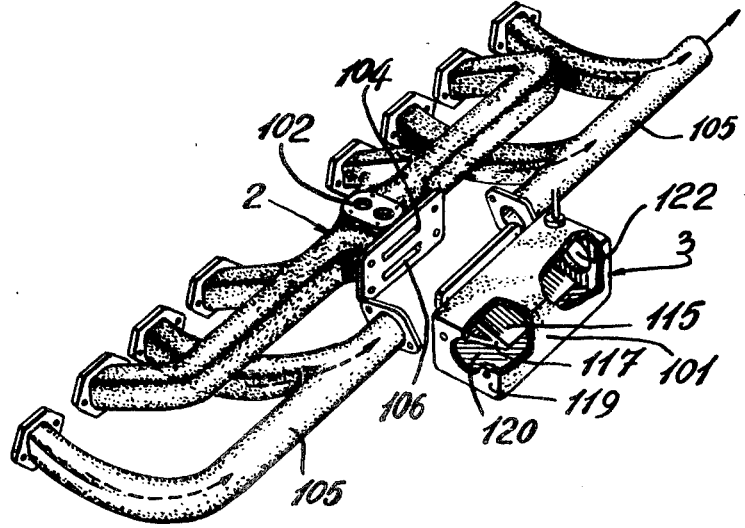
FIG. 2 is a perspective view of an admission and exhaust system incorporating a removeable heat exchanger, partially cut away to show internal details.

FIG. 2 illustrates the mounting of the heat exchanger 3 on the admission system 2 which is incorporated in the exhaust system 105.

The heat exchanger 3 per se, comprises a body 101 having the general shape of an upright hollow prism. Inside of the body 101, there is provided a heat exchange duct 113, having the shape of a V, lying sideways. The duct 113 is preferably rectangular and is defined by the walls 115 and two terminal partitions 117 and 117'.

As will clearly be seen in FIG. 2, the terminal partitions 117 are preferably spaced from the ends 119 of the body 101, in order to provide chamber portions 120 and 122, respectively, for the admission and the exit of the hot combustion gases. The chamber portions 120 and 122 are connected by the halls 108 surrounding the duct 113.

The body 101 of the exchange 3 is a distinct and removeable body, and is fixed by known means on the admission system 2, by disposing in between a high performance thermic insulator 28. Moreover, the body 101 is incorporated into the exhaust system 105 in order that the combustion gases, when crossing the exchange 3 and the halls 108 could efficiently heat the duct 113 of the heat exchange, in order that the mixture of fuel and air which was formed in the compartment B of the carburetion chamber 7, during its passage in said duct 113 could be converted into a mixture of fuel vapour and air.

The vapourization of the fuel produces some kind of deposit in the duct 113 of the heat exchanger. However, the body 101 of the exchanger 3 is removeable, which means that it could be periodically removed to be cleaned in an appropriate solution or one may just decide to change it.

This disadvantage is largely overcome since the carburetion with a mixture of fuel vapour and air prevents the formation of vapours of nitrogen, which are considered to be very toxic, not to mention the cleanliness of the motor oil and, the plugs, etc.

The reservoir 11 of the carburetor is fed with a fuel pump under constant pressure through an adjustable P.R. pressure regulator.

FIG. 11 illustrates a twin pump, with diaphragm, which moves all the fuel of a reservoir not illustrated, through channel 25 which is divided for the two inlets 5 and 5′ of the body 6 of the twin pump which is also provided with two outlets 8 and 8′. The body has two chambers 10, 10′ in which are mounted diaphragms 12, 12′ which are pulled by the strings 14, 14′. Thee inlets 5, 5′ and the outlets 8, 8′ of each chamber 10, 10′ are controlled by unidirectional valves 16, 16′ for chamber 10 and valves 18, 18′ for chamber 10′, these valves operating in reverse direction as shown. The diaphragms 12,12′ are operated by pushers 20, 20′ controlled by a common lever 22 which moves along an oscillatory movement by means of a shaft 24, provided with a cam 17 acting on one end while the other end is applied to the extremities of the pushers 20, 20′. The shaft 24 is obviously operated by the engine itself.

In this description, it will easily be understood that when the shaft 24 rotates, one of the diaphragms 12, 12′ produces a suction while the other, a compression in the duct 26 which is connected to the reservoir 11 of the carburetor through an adjustable pressure regulator P.R. By means of this twin pump, it is possible to eliminate the irregularities in the flow of fuel. The regulator P.R., on the other hand, enables to adjust the pressure inside the reservoir 11 of the carburetor. The duct 26, between the fuel pump and the pressure regulator P.R. is provided with an electronic valve 13, in which the opening and closing are controlled by a switch 19, which will be activated by the contact key.

Again referring to FIG. 11, said valve 13 is illustrated as being of the electric type provided with two solenoids 15, 15′ respectively, controlling the opening and the closing of the valve 13. One end of each solenoid is grounded, while the other ends of the wires are connected to the switch 19, each through an auxiliary contact 27 and 27′.

After having turned the contact key to one of its contact or stop positions, the switch 19 respectively restores the electric circuit of the solenoids 15 or 15′. The auxiliary contacts 27 and 27′ which are respectively part of the electrical circuit of the solenoids 15 and 15′ close the electrical circuit of their respective solenoid as soon as the valve 13 is in open or closed position, in order never to allow the solenoids to remain charged after having done their chore.

When the contact is closed, the valve 13 is immediately closed, while the engine continues to rotate at least 20 to 25 rotations before stopping and this will enable the chambers 10 and 10′ of the pump 16 to be filled with fuel.

When the contact is opened, the valve 13 is immediately opened, and depending on the position of the cam 17, one of the two diaphragms 12 or 12′ or both of them, instantaneously revive the pressure of fuel in the duct 26 which feeds the pressure regulator P.R. In any case, we shall discuss hereinbelow, the importance of obtaining the pressure of fuel a few moments before turning the ignition key on.

It is important to mention now that according to whatever pressure established by the pressure regulator P.R. and independently of the pressure which is exerted by the motor cylinders on the carburetion chambers 7, the flow of fuel is regulated by adjusting the opening of the valves mounted in the reservoir 11 of the carburetor, or communicating with the latter.

FIG. 3 is a vertical cross-sectional view of the carburetor along a plane passing through line 3—3 of FIG. 1, showing the mechanism which operates the two variable fuel flow valves feeding the compartment B of the carburetion chamber 7. The compartment B communicates with the duct of the heat exchanger 113 (FIG. 1) which has already been described and in which the fuel fed by the valves is intended to be evapourated.

The valve 21 is operated by a cam 29 and supplies the necessary fuel for idling and up to an average r.p.m. of the engine, which could be predetermined. A valve 23 will be operated by a second cam 30, and will enter into operation when the engine is required to rotate above said average r.p.m. speed up to its maximum speed. Of course, valve 21 will remain in operation.

Referring again to FIG. 3, the mechanism which will contribute to the consecutive opening of the two variable fuel flow valves 21 and 23 is the following.

The cam 33 rests on a steel ball 31 at the bottom of the reservoir 11 of the carburetor. Adjacent to the steel ball 31, there is a spline shaft portion 34 which is integral with the cam 30 and which slidingly fits in the lower part of the cam 29, the latter being thicker in that particular location.

The outline of the cam 29 is conical, and the purpose of this particular shape will be discussed hereinbelow. In the upper portion of the cam 29, a pivot shaft 32 extends through the cover 35 of the reservoir 11 of the carburetor, the cover being made impervious by means of screws 36. In the opening where the pivot shaft 32 extends through the cover 35, there is a seal 37 which will render the reservoir 11 impervious.

The end of the pivot shaft 32 is hollow, which enables a screw to be fitted therein permitting to push on the cam 29 by allowing the latter to slide a certain distance on the shaft end 34 of the cam 30.

The spring 38 mounted between the two cams 29 and 30 is compressed by the screw 33, thus making sure that the two cams 29 and 30 will be in closed position.

A pinion 39 is mounted at the end of the shaft 32, immediately above the cover 35, where it engages with a toothed rack, which forms part of the acceleration device, whose operation will be explained below.

We shall now consider FIG. 5 which is a cross-section with construction details and shows on large scale, variable fuel flow valves 21 and 23 and a portion of the cams 29 and 30 which respectively control these valves.

Valve 21 is tubular and is terminated at one end by a nozzle. Valve 21 is screwed in the body 1 of the carburetor by means of a thread 40, which is formed around its periphery, in order that the end of the nozzle opens in the compartment B of the carburetion chamber 7, while the other end is in communication with the reservoir 11 of the carburetor. A needle 41 which enables to adjust the opening of the nozzle is maintained rigid against the cam 29 by means of a spring 43. In the tubular portion of the valve, two guides 42 permit a central sliding of the needle 41.

The suction of the valve 23 is different in that a nozzle 44 is screwed in a tubular duct 45, which is maintained rigid in the body 1 of the carburetor 1 by known means, such as threads or the like. The nozzle 44 connects the reservoir 11 of the carburetor and the compartment B of the carburetion chamber. The duct 45 is provided with two guides 46 which enable the central sliding of a needle 47, the latter enabling the adjustment of the opening of the nozzles 44. A spring 48 constantly pushes the needle 47 against the cam 30. A gear system 49 provided on the periphery of the nozzle 44 to engage with an endless screw 50 which can be operated with a screw driver to adjust the latter, as will be explained later.

Referring again to FIG. 3, we can now study the operation of all the mechanisms which take part in the distribution of the fuel.

An acceleration device which will be described below, meshes with the pinion 39, mounted at the end of the pivot shaft 32 of cam 29. Since the shaft end 34 of the cam 30 is provided with splines and fits by sliding in the lower part of the cam 29, the two cams 29 and 30 will start to pivot when the acceleration device is initiated. The cams 29 and 30 are adapted to ensure the consecutive opening respectively of valves 21 and 23.

The needles 41 and 47 which control the opening of the nozzles of the valves 21 and 23 are forced respectively against the cams 29 and 30 by means of springs 43 and 48. Consequently, the opening of the valves is carried out when the cams 29 and 30, by pivoting, are relaxed respectively on needles 41 and 47.

As mentioned above, valve 21 will supply the fuel for idling up to an average r.p.m. of the engine. Valve 23 will start to operate when the engine is required to rotate above this average speed. Obviously, valve 21 will remain in operation.

A minimum opening of valve 21 will be adjusted by the screw 33 to permit a necessary supply of fuel for idling, when the acceleration device is closed. Screw 33 is adjacent to the pivot shaft 32 of cam 29, whose periphery is conical. By unscrewing screw 33, spring 38 which is compressed between the two cams, will push back cam 29 while closing cam 30. The diameter of cam 29 becomes smaller, and while pushing the needle 41 against the cam, spring 43 will adjust the opening of valve 21 to a desired value.

On the other hand, the endless screw 50 which meshes with the gear system 49 made on the periphery of the nozzle 44 making up the valve 23 enables to select the time where the valve 23 will start to open with respect to the position of the cam 30, during the acceleration.

By rotating the endless screw 50 in one direction or the other, the nozzle 44 by being screwed into the duct 45, enables the needle 47 to penetrate a certain distance in the opening of the nozzle 44.

Therefore, during the acceleration and with respect to the same position of the cam 30, the needle 47 will be retracted sooner or later from the opening of the nozzle 44.

FIG. 8 is a perspective view of the mechanism constituting the acceleration system, which is adapted for the carburetor illustrated in FIG. 1 and which is characterized by the following.

The air admission butterfly valve 9 is connected to a choke 52, enabling to delay or slow down the opening of the valve 9 depending on the openings of the variable fuel flow valves 21 and 23, said valves 21 and 23 being directly operated by an acceleration device 60. When the openings of the valves 21 and 23 are stabilized, the opening of the air admission butterfly valve 9 is automatically adjusted, so that for a given pressure of fuel, the mechanism enables the carburetion chamber 7 to produce a mixture flow in which the volume ratio of fuel and air is constant for any condition under which the engine operates.

We shall refer again to FIG. 8 in order to better follow the operation of the acceleration system, step by step.

The acceleration device 60 is directly connected to a mechanism made of a lever 55, having a suitable shape and being provided with an abutment 56. The lever 55 is connected to a toothed rack 53 which meshes with the pinion 39 mounted on the pivot shaft of the cams 29 and 30. A second toothed rack 54 is connected to a spring 59 in which the other end is fixedly mounted on the body 1 of the carburetor. The second toothed rack 54 is parallel to the lever 55 in order that they be movable with respect to one another. Said toothed rack 54 is also provided with an abutment 57 which is adapted to be positioned against the abutment 56 of the lever 55, while the engine is operating normally. A pinion 62 is mounted at one end of the pivot shaft 61 of the air admission butterfly valve 9. Said pinion 62 meshes with the toothed rack 54, and the other end of the pivot shaft 61 is connected to a choke 52.

During an acceleration, the device 60 moves both the lever 55 and the toothed rack 53. Consequently, the device 60 immediately adjusts the openings of the valves 21 and 23, which are respectively controlled by the cams 29 and 30 (FIG. 3). It will be noted that the lever 55 will move the abutment 57 in the direction indicated by the arrow; being free of engagement with the abutment 56, the spring 59 pulls on the toothed rack 54, which meshes with the pinion 62 mounted at the end of the pivot shaft 61 of the butterfly valve 9, but the opening of said air admission butterfly valve 9 is slowed down by the choke 52, mounted at the other end of the pivot shaft 61. When the abutment 57 of the toothed rack 54 again rests against the abutment 56 of the lever 55, the mixture of fuel and air which is produced in the carburetion chamber 7 will again be in ideal volume ratio. It should be noted that the lever 55 is also connected at 4 of the pressure regulator P.R., whose operation will be explained below.

According to FIGS. 1 and 3, the amount of fuel supplied by the valves 21 and 23 in the compartment B of the carburetion chamber 7 is intended to be evaporated by passing through the duct 113 of the heat exchanger, while the air which the air admission butterfly valve 9 allows to pass can pass in both compartments A and B. In order that during a sudden acceleration, the equilibrium of the mixture of fuel vapour and air which is received by the motor cylinders be broken in favour of the air, choke 52 slows down the opening of the butterfly valve 9 with respect to the opening of the valves 21 and 23.

This system enables a true acceleration, while preventing the necessity to introduce an excess of fuel during the acceleration, which, in my opinion, is useless, because in our days, engines are not raced with a charge. On the other hand, this is the same thing because the explosive mixture which the motor cylinders receive is richer in fuel during the acceleration. See the operation of the pressure regulator which is explained below.

In order to decrease the explosion power losses which result from a premature expansion of air during its passage through the heat exchange duct 113 (FIG. 1), the carburetion chamber 7 is provided with automatic control means enabling to adjust the proportions of the quantities of air which pass through the compartments A and B of the carburetion chamber 7, respectively connected to the admission system 2 by means of the passage 102 and the heat exchange duct 113.

With reference to FIG. 1, it can be seen that below the air admission butterfly valve 9, the two compartments A and B are each provided respectively with a butterfly valve 63 and 64, which are fixed on a pivot shaft 65, extending through the two compartments A and B and that the butterfly valves 63 and 64 fixed on said shaft 65 are substantially perpendicular to one another.

In compartment B of the carburetion chamber 7, which is connected to the heat exchange duct 113, the butterfly valve 64 is open, when the duct 113 is cold, while in the compartment A, which is connected to the passage 102 which is not heated, the butterfly valve 63 is closed.

One end of the pivot shaft 65 of the butterfly valves is provided with a lever 67, which is connected to a thermostat 68 by means of a control rod 66. The thermostat 68 is mounted in the admission system 2, exactly where the combustion mixtures are introduced into the combustion chambers.

As the temperature of the combustion mixtures increases in the admission system 2, the thermostat 68 operates the mechanism made of the rod 66 and the lever 67 to pivot the pivot shaft 65, carrying the butterfly valves 63 and 64, respectively mounted in compartments A and B. On the other hand, the butterfly valve 63 opens to allow a larger quantity of air to be directly introduced into the admission system 2 through passage 102, while at the same time, valve 64 decreases the amount of air which accompany the vapour fuel in the heat exchange duct 113.

Referring to FIG. 7, there is illustrated another embodiment of the control means to adjust the proportion of the quantities of air which are allowed to pass into the compartments A and B.

A valve 69 is mounted horizontally at the inlet of the compartments A and B. This valve is connected to a thermostat, not shown, by means of a control rod 70. This thermostat is placed in the admission system, and is dependent on the temperature of the combustion mixture which is allowed to be introduced in the combustion chambers. The thermostat operates the valve 69 which moves perpendicularly to the passage of air, thus consecutively closing one or both compartments of the carburetion chamber.

This last system will be more useful when the carburetor supplies a motor having only one cylinder, having in mind the air beats in the carburetion chamber, mainly during idling.

It should be noted that the control means described in connection with FIGS. 1 and 7 to adjust the proportion of the quantities of air which pass in both compartments of the carburetion chamber will at no time, prevent the air from passing in either of the compartments.

FIG. 6 is a prespective view, partially cut away, illustrating variable fuel flow valve 23.

I would like to mention that when the carburetor is intended to be associated with an engine having a small number of cylinders, it is not necessary to have two valves 21 and 23 which we have shown in FIG. 5.

To ensure an exact distribution of fuel, only one valve is sufficient. In the present case, the endless screw 50 which meshes with the gear system 49 made on the periphery of the nozzle 44 will be used to provide a minimum opening making it possible to have the necessary amount of fuel for idling. Guide 46 which allows for the central sliding of the needle 47 can also be seen, said guide being provided with openings 51 for allowing passage to the fuel.

FIG. 4 shows the carburetor in section 4—4 of FIG. 3. In the reservoir 11 of the carburetor, two cams 29 and 30 respectively controlling the opening of the valves 21 and 23 which supply the compartment B of the carburetion chamber 7, can be seen. Finally, a valve 71, also of the variable fuel flow type, opens in the compartment A of chamber 7, which communicates with the passage 102 of the admission system 2 of FIG. 1.

Said valve 71, which can also be called starter valve, is connected to an automatic or manual control system, not illustrated, and will be intended to supply a surplus of fuel, to ease off starting under cold weather.

By a simple calculation, it will be realized that in a carburetion system operating with a mixture of vapour fuel and air, the ideal combustion mixture should consist of about 32% vapour fuel and 68% air. Any excess of fuel will become a loss insofar as the power of the explosion is concerned, because the mixture does not have enough oxygen to burn it.

Obviously, my carburetion system does not provide for a cooling of the pistons of the engine by introducing an excess of fuel, as is the case with the other known carburetion systems.

In order to prevent an excessive dilatation of the pistons, certain modifications can easily be brought about in their manufacture, in order to increase their cooling by the lubricating oil of the engine. If this is not sufficient, I believe that present knowledge can easily produce light alloy pistons in which the dilatation factor is well below ordinary pistons.

The knowledge acquired in the aeronautic field, which has been so costly to the taxpayer, could be useful in this field. In any case, this detail should not prevent the development of this subject.

It will be recalled that the reservoir of the carburetor is supplied by a fuel pump under constant pressure through an adjustable pressure regulator and that said regulator is connected to automatic control means enabling to vary the pressure of the fuel inside the reservoir of the carburetor, depending on the conditions of operation and the behaviour of the engine in general.

Depending on a given pressure established by the regulator and independently of the negative pressure exerted by the motor cylinders on the carburetion chamber, the flow of fuel is adjusted by adjusting the opening of the valves mounted on the reservoir of the carburetor, or in communication with the latter.

Figure 12:
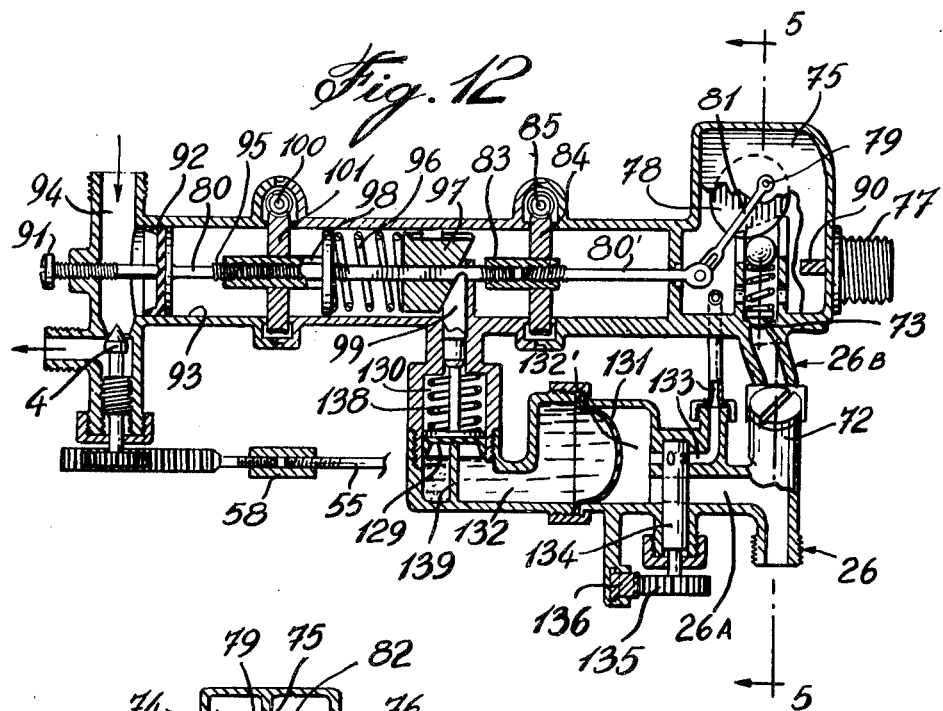
FIG. 12 is a longitudinal sectional view of a pressure regulator.

It should be mentioned here that the pressure regulator is provided with manual controls, which enable to preadjust two different basic pressures (FIG. 12).

A first control enables to preadjust a basic average pressure for the operation of the motor when it is cold.

A second control enables to control an average basic pressure for the operation of the motor under normal conditions.

An automatic control mechanism selects a second maximum pressure, when the motor becomes hot. This pressure will be lower than the maximum basic pressure selected when the motor is cold (this detail is not illustrated but will be explained later).

A device automatically readjusts said preadjusted basic pressures, depending on the atmospheric pressures.

A second device, controlled by a thermostat, automatically selects the higher basic pressure, when the motor is cold, and said average pressure when the motor becomes hot, or rather when the heat exchanger which is used in the carburetion system becomes operational.

A hydraulic system with automatic control, readjusts the pressure of fuel established by the mentioned devices, depending on the r.p.m. of the engine, with respect to the position of the acceleration device, in order that a variation of the r.p.m. of the engine with respect to a fixed position of the acceleration device, or vice versa, automatically causes a variation of the pressure of fuel by the said regulator, which is limited between a basic maximum pressure in force depending on whether the motor is cold or hot, and a zero pressure.

Figure 13:
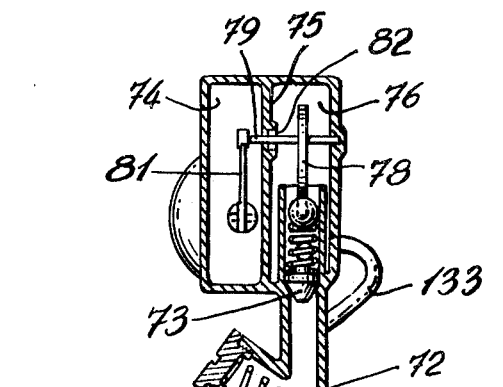
FIG. 13 is a vertical cross-sectional view of the regulator on a plane passing through line 5—5 of FIG. 12.
Figure 14:
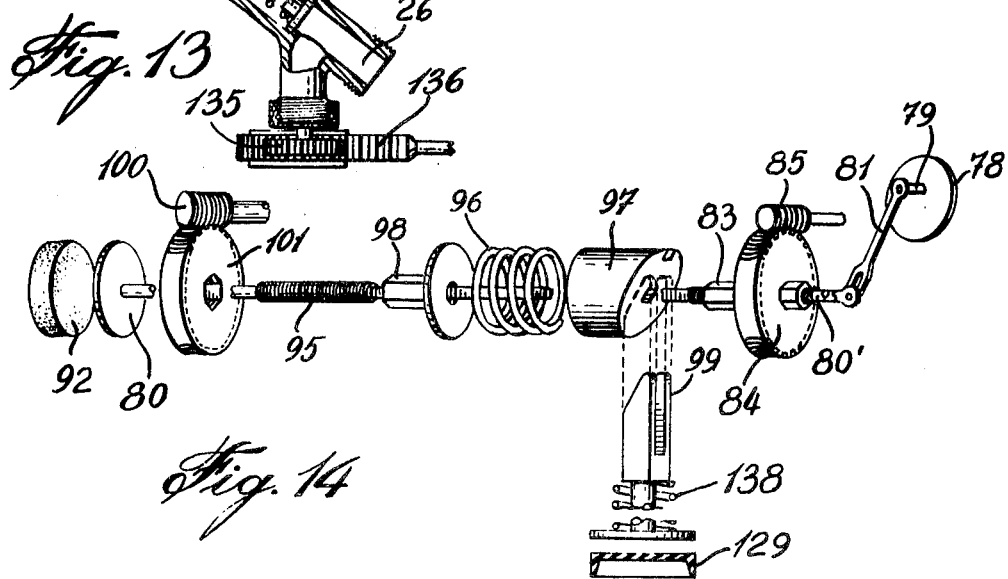
FIG. 14 is an exploded view of the pieces constituting the mechanism of the pressure regulator.

We shall now consider FIG. 12, where the pressure regulator is shown in perspective view, and for better understanding the description which will follow, we will also refer to FIG. 13, which represents the regulator through a line along plane 5—5 of FIG. 12, and we will also refer to FIG. 14 which illustrates the shapes of the elements of the regulator.

According to FIG. 12, the channel 26 which feeds the pressure regulator is divided into two sections 26A and 26B.

Section 26B of the channel 26 is provided with two pressure valves in which the first one is a constant pressure valve 72 intended to reduce the raw pressure exerted by the fuel pump. The second valve 73 is a variable pressure valve and will serve to adjust the pressure of fuel inside the reservoir 11 of the carburetor from said reduced pressure.

The pressure regulator P.R. is provided with two compartments 74 and 76 which are separated from one another by an impervious partition 75 (FIG. 13). The variable pressure valve 73 is mounted in the compartment 76, which communicates with the reservoir 11 of the carburetor by the outlet 77, which is screwed into the wall of said reservoir. The control of the variable pressure valve 73 is provided by a cam 78, which is mounted on a pivot shaft 79 in which one end extends through the wall 75, where a seal 82 provides a good seal for the compartment 76. The end of the pivot shaft 79 in the compartment 74 is provided with a lever 81, which is connected to an alternative rectilinear movement control shaft, which ensures the pivoting of the pivot shaft 79 in the two directions.

The control shaft is made of two members, 80 and 80', which are connected by a threaded sleeve 83. Since the two members 80 and 80' are respectively provided with a left-hand thread and a right-hand thread by rotating said thread sleeve 83 in one direction, the two members 80 and 80' of the control shaft will come closer to one another and by rotating in the other direction, the two members of the control shaft will move away from one another.

An endless screw gear system enables to rotate the threaded sleeve 83 in both directions with the result that the pivot shaft 79 will pivot with the cam 78. The above gear system is made of an endless screw 85 which meshes with a gear 84, in which the central aperture is provided with splines, which enables the sliding of the threaded sleeve 83.

An alternative embodiment according to FIG. 7 consists in connecting the two members 80 and 80' making up the control rod by means of a knob 86. From the knob and on a predetermined length, the member 80' is provided with splines 89 and it is shaped as an endless screw at the other end, the endless screw meshing with a gear 87 mounted on the pivot shaft 79 of the cam 78. The endless screw gear system previously described enables to cause the member 80' to rotate on its axis and in two directions. The net result is that the pivot shaft 79 with the cam 78 can pivot in one or the other direction.

According to FIG. 12, the alternative rectilinear movement of the control shaft is limited by two abutments. The first abutment 90 is fixed, the second abutment is an adjustment screw 91. When the control shaft is moved in the direction of the fixed abutment 90, the pressure of fuel in the reservoir 11 of the carburetor decreases gradually, until it becomes equal to zero; when the shaft hits upon the adjusting screw 91, a maximum pressure is obtained.

The member 80, defining the control shaft, is provided at its end with a piston 92 which is movable in a cylinder 93, which cylinder communicates with a partition 94. A portion of the member 80 on the side of the piston 92 is provided with a threading 95.

A spring 96 is held against a cam 97 sliding on the shaft 80 by means of a screw 98 which uses the above-mentioned threading 95. The sliding cam 97 is stopped by a fork-type pusher member 99 which is bevelled and has a predetermined thickness. A second gear system which enables to preadjust the tension in the spring is made of an endless screw 100 which meshes with a gear 101 in which the central aperture is provided with splines, which enables the sliding of the screw 98.

Figure 16:
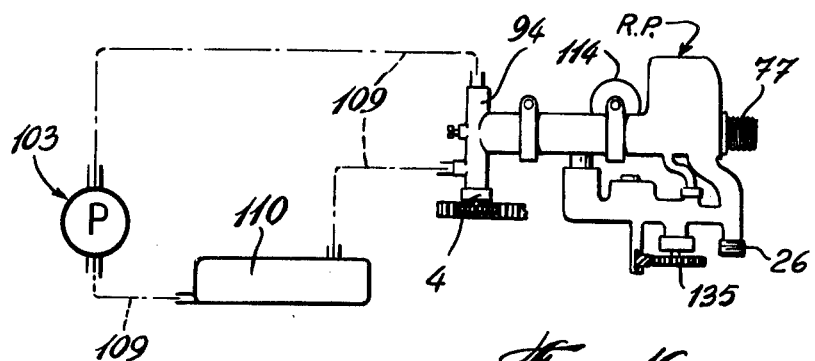
FIG. 16 is a view of the hydraulic circuit which is part of a control system for the pressure regulator.
Figure 17:
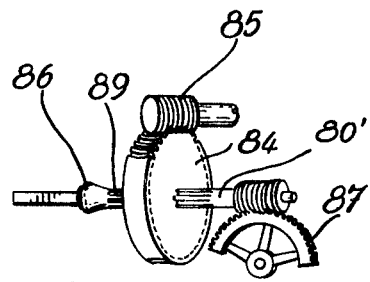
FIG. 17 is a view illustrating an alternative solution for the construction of the control shaft of the pressure regulator.

A pump 103, operated by the engine (FIG. 16), whose flow is proportional to the r.p.m. of the engine, establishes an oil flow circuit by means of the channels 109 through partition 94 of the pressure regulator (P.R.). The oil flow, when it passes through partition 94, exerts a pressure on the piston 92 which is mounted at one end of the control shaft 80. The other end of the shaft is connected to the pivot shaft 79 of the cam 78 which operates on the variable pressure valve 73, by means of the lever 81. In this matter, the alternative rectilinear movement of the control shaft operates on the valve 73 which is responsible for the variation of the pressure of fuel in the reservoir 11 of the carburetor.

A valve 4 in which the opening is controlled by the acceleration device is adjusted at the outlet of the partition 94, to return the flow of oil in a reservoir 110 (FIG. 16)., from where the pump 103 will be responsible for the recirculation. The opening of the valve 4 is controlled by the acceleration device in order that during its passage through the above-mentioned partition 94, the oil will be under the same pressure whenever the engine operates under stable, normal conditions for a particular type of engine.

The pressure of oil acts on the piston 92 by pushing the control shaft in the direction of the fixed abutment 90, but the oil pressure on the shaft is equilibrated by the spring 96 which the oil should more or less force against the cam 97. Consequently, the control shaft will stop and, by the same token, there will be obtained a basic average pressure of fuel in the reservoir 11 of the carburetor.

The average basic pressure of fuel could be adjusted, when the motor is idle, and when said heat exchanger is functional, by means of the endless screw gear system 100, 101, which enables to preadjust the tension in the spring 96 with a screwdriver.

The reservoir 11 of the carburetor is provided with a valve 112 (FIG. 3) which enables to get rid of any possible air pocket; moreover, valve 112 makes it possible to measure or verify the pressure established by the pressure regulator.

Figure 15:
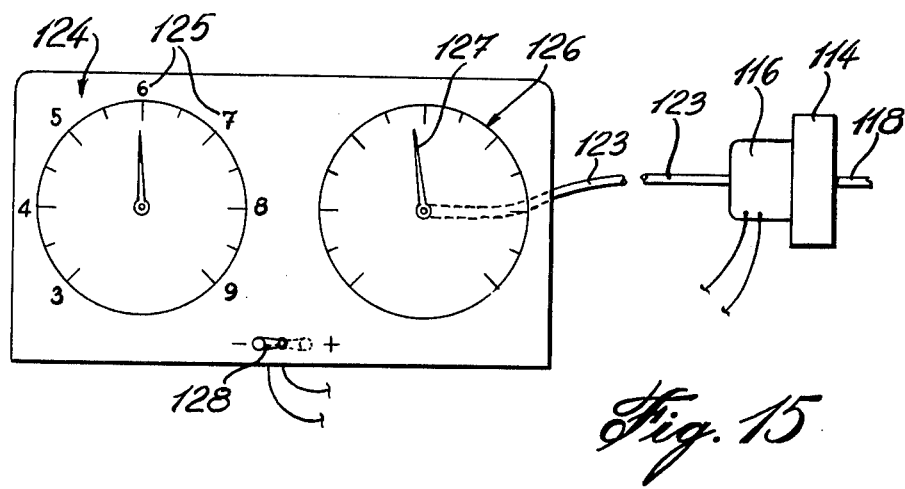
FIG. 15 is a view illustrating the dials and the mechanism which, respectively, determine and readjust the pressure regulator according to the various atmospheric pressures.

A device which is responsive to the atmospheric pressure, automatically readjusts said preadjusted basic pressures. The device, according to FIG. 15, also comprises a mechanism 114 which is made of a miniature electric motor 116 which can rotate in both directions, and in which the r.p.m. is reduced by means of a gear and pinion system. The mechanism 114 is mounted on the pressure regulator by known means, such as screw, etc., in order that the shaft portion 118 be adapted to induce the endless screw 85 to rotate (FIG. 12), according to needs.

Also, if the motor vehicle has an oil gauge in which the scales are made with reference to the average pressure of the fuel which should be maintained in the reservoir 11 of the carburetor, depending on the atmospheric pressure, the device then comprises a barometer 124 which is mounted on the dashboard. The dial of the barometer or a second dial 126 having the same scales with the same figures, and the needle 127 is connected by a steel wire 123 to the mechanism 114 which induces the endless screw 85 to rotate.

The adjustment of the second dial 126, with respect to the dial of the barometer 124 can be automatically controlled by an electronic system or by pushing on a selector switch 128.

Of course, the pressure in the reservoir 11 of the carburetor should be exactly that indicated by the needle 127 of the dial 126 when the engine operates under normal conditions.

Again referring to FIG. 12, it should be reminded that the thrust of the pressure of the oil flow on the control shaft is balanced by the spring 96, whose tension has been previously adjusted.

Consequently, a variation of the r.p.m. of the engine with respect to a fixed position of the acceleration device, or vice versa, automatically means a variation of the oil pressure in said partition 94 and the result is that there will also be a variation of the pressure of the fuel in the reservoir 11 of the carburetor, which is limited between the predetermined maximum basic pressure and a pressure equal to zero.

We shall now reconsider the entire acceleration system according to FIG. 8.

The mechanical member which we have previously called lever 55 is connected to a toothed rack 53 which meshes with the pinion 39, mounted on the pivot shaft 32 of the cams 29 and 30, and to the valve 4 which adjusts the out flow at the outlet of the partition 94 (FIG. 12).

A sudden thrust of the acceleration device 60 displaces the lever 55 which synchronizes the consecutive openings of the variable fuel flow valves 21 and 23 respectively controlled by cams 29 and 30 by means of said valve 4. The pressure which is exerted by the oil flow, suddenly decreases in the partition 94. The spring 96 pushes back the control shaft and comes to rest against the adjusting screw 91. Consequently, the pressure of fuel in the reservoir 11 of the carburetor has reached the maximum basic pressure which has been preadjusted by the screw 91. The air admission butterfly valve 9, whose opening has been delayed by the choke 52, is adjusted with respect to the opening of the valves 21 and 23 and when the r.p.m. of the engine is stabilized, the pressure of the oil flow becomes normal, it pushes away the control shaft and the pressure of the fuel in the reservoir 11 of the carburetor is stabilized at the average basic pressure which is in force.

Thus, the motor will again receive a mixture of fuel vapour and air under ideal volume ratio.

Now, let us suppose that the engine rotates at 4000 r.p.m. The acceleration device 60 is suddenly released, the lever 55 returns to its original position by forcing the valves 21 and 23 as well as the valve 4, to go back to their initial position as adjusted for engine idling. The pump 103 continues to supply the oil flow in proportion to the r.p.m. of the engine, but the valve 4 is adjusted for an idling at 450 r.p.m. Consequently, the pump 103 produces a larger pressure in the partition 94 which pushes the control shaft against the fixed abutment 90 (FIG. 12) and at this moment, the pressure of fuel in the reservoir 11 of the carburetor becomes zero, until the r.p.m. of the engine nears the idling speed at which the pressure of the spring 96 starts to balance with the pressure of the oil flow. The pressure of the fuel increases to be stabilized at the average basic pressure in force.

To summarize, during the acceleration, the explosive mixture which the motor cylinders receive is richer in fuel vapour and during the slowing down, the flow of fuel is zero.

It should be noted that the adjusting screw 91 (FIG. 12) is provided to preadjust a maximum basic pressure of fuel which the engine needs to start or when the latter operates under cold conditions. This condition prevails until the heat exchanger 3 becomes sufficiently hot to be functional.

The pressure regulator is provided with a thermostat-controlled device, to select any one of the preadjusted basic pressures, depending as to whether the motor is cold or hot. This device is also a hydraulic system, and in order to operate it uses the raw pressure of fuel introduced by the fuel pump.

Referring again to FIG. 12, the sliding cam 97 comes to rest against the fork type pusher 99, under the thrust of the spring 96, the fork having a predetermined thickness, and in which the end is bevelled. The fork type pusher 99 is connected to a piston which moves in a cylinder 130, which communicates with a chamber which is divided into two parts by means of a membrane 131, the latter being flexible and impermeable. The first portion 132 of the chamber which communicates with the cylinder 130 of the piston 129 is filled with oil. The portion 26A of the channel 26, which supplies the pressure regulator, opens in the second portion 132' of the chamber, and this second portion 132' is connected to the compartment 76 of the pressure regulator by means of a duct 133.

A two-way valve 134 consecutively opens and closes the channel 26A and the duct 113. A pinion 135 mounted at the end of the valve 134, meshes with a toothed rack 136 which is connected to a thermostat 137 (FIG. 1), mounted on the body 3 of the heat exchanger.

When the motor is cold, the thermostat 137 adjusts the position of the valve 134 into an open position in the portion 26A of the channel 26, and closed in the duct 133. In the "on" position 19 (FIG. 11) to start the engine, the valve B opens and the fuel which is accumulated in the chambers 10—10' of the twin pump will be pushed back respectively by the membranes 12, 12', in the channel 26, from where the fuel will pass through the portion 26B towards the reservoir 11 of the carburetor and towards the portion 26A, in the portion 132' of the chamber. The pressure of fuel acts through the membrane 131, by compressing the oil in the first portion 132 of the said chamber.

The pressure of oil thus obtained, will push the piston 129 by means of the fork type pusher 99, which in turn, will push back cam 97 by compressing the spring 96. The spring 96 thus compressed, will prevent the normal displacement of the control shaft; therefore, the pressure of fuel inside the reservoir 11 of the carburetor will be in the vicinity of the maximum basic pressure predetermined by the screw 91.

When the engine becomes hot, and the body 3 of the heat exchanger is functional, the thermostat 137 operates the valve 134 which closes the fuel passage in the portion 26A of the channel 26, and thereafter, it opens the duct 133.

A spring 138, pushes back the piston 129, with the fork type pusher 99 to its initial position against the abutment 139, and thereafter pushes back the fuel which is accumulated in the second portion 132' of the chamber by means of the duct 133 towards the reservoir 11 of the carburetor. The cam 97 thus being freed, the control shaft will again normally operate. Thus, the pressure of fuel in the reservoir 11 of the carburetor will decrease and be maintained in the vicinity of the average basic pressure in force.

In order to establish that the above-described hydraulic system is functional, I will give values for different pressures. Of course, the figures given are only approximate, but should be quite close to real values.

I refer to FIG. 12 under normal atmospheric pressure:

the maximum basic pressure of fuel preadjusted by means of the screw 91 for the start and when the motor operates cold, is 1.5 lbs. per sq. in.

once the engine is in operation, a pump which is operated by the engine, in which the flow is in proportion to the r.p.m. of the engine, establishes an oil flow circuit, which when it passes in the partition 94, exerts a pressure on the piston 92 mounted at the end of the control shaft. The valve 4, in which the opening is controlled by the acceleration device adjusts the opening of the valve 4, in order that the oil flow exerts the same pressure of "2 lbs." on the piston 92 for any conditions of the engine when the engine operates under normal operating conditions, depending on the use to which the engine has been put when the heat exchanger is operational, the "2 lbs." of pressure exerted by the oil flow on the control shaft are balanced by the spring 96, and the average basic pressure of the fuel thus obtained will have a value of "0.6 lbs." only.

Let us now suppose that one wishes to start a cold motor. The ignition key 19 (FIG. 1) is turned, the valve 13 opens and there will be an instantaneous pressure of the fuel of "7 lbs.".

This "7 lbs." of fuel pressure will be reduced to "2 lbs." in the portion 26B of the channel 26, by means of the constant pressure valve 72. From these "2 lbs." of pressure, the variable pressure valve 73, operated by the control shaft, will adjust the various pressures in the reservoir 11 of the carburetor.

the valve 134 being open in the portion 26A of the channel 26, the "7 lbs." of fuel pressure will compress the oil in the chamber 132. In order to push the piston 129 with the fork type pusher 99, the oil pressure thus obtained, will compress the spring 138 which has a value of "3 lbs." thereafter, the spring 96 which has a value of "2 lbs." which makes a total of 5 lbs. Thus, from the "7 lbs." of pressure fuel, there will be "2 lbs." of useful pressure to push the piston 129 with the fork type pusher 99.

When the heat exchanger becomes operational, the thermostat 137 which is mounted on the body 3 of the heat exchanger, operates the valve 134, which closes the passage in the portion 26A of the channel and thereafter, it opens the passage in the duct 133.

The spring 138, having a thrust of "3 lbs.", should push back the piston 129 by removing the fuel from the second portion 132', of the chamber which in the compartment 76 (FIG. 13) communicates with the reservoir 11 of the carburetor, where the maximum basic pressure is only "1.5 lbs.". Therefore, the hydraulic system operates.

It should be observed in passing, that with a sudden acceleration, the valve 4 which is operated by the acceleration device, suddenly opens which means that the pressure of the oil flow in the partition 94 becomes zero, which enables the spring 96 to push back the control shaft up to the adjustment screw 91; the result is an increase of the pressure of fuel, which reaches the maximum basic pressure, preadjusted for a cold motor.

When the heat exchanger is operational, and since the opening of the air admission butterfly valve 9 is delayed with respect to the opening of the valves 21 and 23 (FIG. 8), it becomes useless that the pressure of fuel in the reservoir 11 of the carburetor be as high during the acceleration. It would be profitable to replace the adjustment screw 91 by an automatic control mechanism which could preset a second maximum basic pressure of fuel when the heat exchanger becomes operational. This pressure will be lower than the maximum basic pressure preadjusted for a cold motor. The second maximum pressure should have a value of "0.9 lbs.", if the above pressure values are taken into consideration.

It should also be recalled that the basic pressures are adjusted in consideration of normal atmospheric pressure. The endless screw gear system 85 has been provided to readjust the basic pressures, depending on the different atmospheric pressures which could be in force.

Considering FIG. 12, it will be observed that when the heat exchanger is operational, the thrust of the pressure of the oil flow on the control shaft which is the same under any conditions when the engine is stable, will be balanced by the spring 96.

Now, if the average basic pressure of 0.2 lbs. is increased, all the other basic pressures will automatically increase by 0.2 lbs. because the control shaft has been shortened with respect to the same position of the piston 92 mounted at one end of the shaft.

Referring now to FIGS. 9 and 10, there are illustrated, a mechanism in perspective view which enables the distribution of the mixture of fuel and air, and a mechanism which enables to adjust the temperature of the combustion mixture at the entrance to the motor cylinders.

These mechanisms are provided to equip and improve the carburetor, which is provided with two carburetion chambers, in which the first of these two chambers has an air admission butterfly valve 9, said chamber being fed by means of variable fuel flow valve 21, said first chamber enabling a carburetion for idling and up to a predetermined average speed.

The second carburetion chamber having an air admission butterfly valve 9' and being fed by the variable fuel flow valve 23, will start to operate when the motor is required to rotate above said average speed of the engine.

Each carburetion chamber below the air admission butterfly valves 9, 9' is divided thus forming two compartments which are independent of one another, A, B and A', B' (FIG. 10).

The variable fuel flow valves 21 and 23 respectively feed the compartments B and B' of their respective carburetion chamber.

In view of the fact that the construction of the two valves 21 and 23 as well as their operating conditions are absolutely identical according to the above explanation with reference to FIGS. 3 and 4, we will only consider the operation of the entire mechanism which enables to realize a flow of combustion mixture consisting of an ideal volume ratio of fuel and air.

According to FIG. 9, the acceleration device 60 is dependent on a toothed rack 140 which meshes with the pinion 39 which is mounted at the end of the pivot shaft 32 of the two cams 29 and 30. Said toothed rack 140 is provided with an abutment 148 which is adapted to adjust the movement of a carrier 150 which moves parallel and in the same direction as the toothed rack 140 by sliding in a recess made in the body 1 of the carburetor. One of the ends of the spring 149 is fixed to the body 1 of the carburetor, the other end being fixed on the carrier 140 in order that it exerts a constant traction on the latter. Moreover, the carrier 140 is also connected to a choke 52.

A first toothed rack 141 provided with an abutment 153, meshes with the pinion 143 mounted at one end of the pivot shaft 61 of the butterfly valve 9, which controls the admission of air in the first carburetion chamber. The other end of the shaft 61 is connected to a coil spring 144 which exerts a tension in the direction indicated by the arrow 151.

A second toothed rack 142 meshes with the pinion 154 fixed at one end of the pivot shaft 155 of the air admission butterfly valve 9' which pivots in the second carburetion chamber.

The other end of the shaft 155 is also connected to a spring 145, which exerts a tension on the pivot shaft 155, in the direction indicated by the arrow 157.

The two cams 29 and 30 are adapted to enable the consecutive openings, respectively of the variable fuel flow valves 21 and 23. When pushing down on the acceleration device 60, (in the direction of the arrow 156), the toothed rack 140 immediately moves and in view of the fact that it meshes with the pinion 39 mounted at the end of the pivot shaft 32, of the two cams 29 and 30, it adjusts the opening of the two valves 21 and 23.

The carrier 150 being free of engagement with the abutment 148, the sudden traction of the spring 149 will be slowed down by the choke 52, so that the carrier 150 will first move slowly and thereafter faster and faster until it again hits the abutment 148 of the toothed rack 140; the same operation is repeated from any position of the carrier 150.

At the same time, the tension of the coil spring 144 connected to the pivot shaft 61 of the air admission butterfly valve 9 forces the valve 9 to pivot in order to allow a greater quantity of air to pass. However, the coil spring 144 can only follow the movement of the carrier 150, since the pinion 143, which is attached at the other end of the pivot shaft 61, meshes with the toothed rack 143 whose abutment rests against the carrier 150.

When the toothed rack 141 abuts against the abutment 158, the air admission butterfly valve 9, at the end of its run has reached open position where the penetration of air in said first carburetion chamber is at a maximum and at the same time, the carrier 150 which continues to advance, hits upon the toothed rack 142 and pushes it to its limit, or until the path of the carrier 150 is stopped by the abutment 148 of the toothed rack 140.

The adjusting screw 159 enables to adjust the moment when the carrier should begin to push the toothed rack 142.

The coil spring 145 which is operatively connected to the pivot shaft 155 exerts a tension on the shaft 155 in the direction of arrow 157, thus producing a movement which is contrary to the displacement of the carrier 150, and therefore firmly maintains the toothed rack 142 against the carrier 150.

When the acceleration device 60 is relaxed, it immediately goes back into its starting position, under the pulling force of a spring (not illustrated); the toothed rack 140 being connected to the device 60 follows this movement while carrying with it the carrier 150 by means of the abutment 148, in view of the fact that the choke 52 acts only in one direction. The net result is the immediate and successive closing of the air admission butterfly valves 9' and 9. The butterfly valve 9' is closed under the pressure of the coil spring 145, while the butterfly valve 9 will be closed by the displacement of the carrier 150 which on its return, will hit upon the abutment 153 of the toothed rack 141. At the same time, the two variable fuel flow valves 23 and 21 will also close, as a result of the action of the cams 30 and 29, except that the valve 21 will remain open, and adjusted to allow just enough fuel for enabling the motor to run idling.

To summarize, we should remember that the acceleration system described with reference to FIG. 9 ensures the successive operation of the two carburetion chambers and it is mainly characterized by the fact that a mechanism will delay the opening of the air admission butterfly valves 9 and 9'; then, it automatically adjusts their opening with respect to the opening of the variable fuel flow valves 21 and 23 in order that for a predetermined fixed pressure of fuel, the flow of combustion mixture will have a constant volume ratio of fuel and air, whenever the engine operates under stable conditions. On the other hand, referring again to FIG. 9, it will be realized that the toothed rack 140 is directly operated by the acceleration device 60; it is also connected to the valve 4 of the pressure regulator, whose operation remains strictly the same as the one described previously with reference to FIGS. 12, 13 and 16.

Referring now to FIG. 10, one will see the device which enables to regulate the temperature of the combustion mixture at the inlet of the combustion chambers of the engine.

The mounting of the carburetor is the same as illustrated in FIG. 1, i.e., a heat exchange duct 113 connects the compartments B and B' to the admission system 2, while a (unheated) duct 102 connects the compartments A and A' directly to the admission system 2.

It will be recalled that the compartments B and B' are respectively supplied by the variable fuel flow valves 21 and 23, which supply the fuel for any condition of the engine.

A manual or automatically controlled valve 71 opens into the compartment A of the first carburetion chamber, and supplies an excess of fuel when starting the engine, especially when this is required in view of cold weather during winter.

In each carburetion chamber, the two compartments A and B are each provided respectively with a butterfly valve 63 and 64 which are mounted on a pivot shaft 65 extending through the two compartments A and B and in the same carburetion chamber; the butterfly valves 63 and 64 which are mounted on the shaft 65 are substantially perpendicular to one another.

In the compartment B of each carburetion chamber which is in communication with the heat exchange duct 113, the butterfly valve 64 is in open position, when the heat exchange duct 113 is cold, while in the compartment A which communicates with the (unheated) duct 102, the butterfly valve 63 is closed.

A thermostat 68 is mounted in the admission system 2 exactly where the combustion mixture penetrates into the carburetion chambers (according to FIG. 1) and depending on the temperature of said combustion mixture, the thermostat 68, by means of a suitable device moves a toothed rack 147 which meshes with the pinion 146 mounted at the end of each pivot shaft 65 carrying each of the butterfly valves 63 and 64.

It should be noted that the control means previously described to regulate the proportion of the quantities of air which pass through both compartments of the two carburetion chambers should never constitute a total blockage of the air in the compartments B and B', because it is exactly the air passage in the heat exchange duct 113 (FIG. 1) which induces the fuel vapours to penetrate into the admission system 2.

The two types of carburetors described previously operate in a characteristic manner of a continuous injection system having a variable flow of fuel, in which the carburetor is supplied with fuel under constant pressure through a pressure regulator under control and that for a given pressure, the flow of fuel is regularised by adjusting the opening of valves, and, vice versa with respect to any opening of the valves, the flow of fuel is also regularised by the pressure regulator, which enables to vary the pressure of fuel depending on the conditions of operation and of behavior of the motor in general.

In order to produce a sure and rapid start of the motor at any given time, the description according to FIG. 11 proposes a system for feeding the carburetor, which should give an instantaneous pressure of fuel as soon as the ignition key is turned to start the engine.

Obviously, other similar means could be used, but the ideal and most simple solution is to make a compromise between the traditional operation of a carburetor and the proposed injection system.

The idea is to built a carburetor which, as soon as the motor is started, ensures a flow of fuel under the effect of the partial vacuum which is exerted by the cylinders of the motor on the carburation chamber according to the principle of a traditional carburetor, and as soon as the motor rotates and that a constant pressure of the fuel is established, other valves are operated to distribute the fuel by controlled injection, as previously described.

We shall now refer to FIG. 18 which is another view taken along a plane passing through line 4—4 of FIG. 3 taking for granted that FIG. 3 represents the modified carburetor, in a position where the minor change made thereto is not visible. Consequently, by considering FIG. 18, it will be observed that the carburetor is provided with two fuel reservoirs 11 and 11'.

The reservoir 11 is maintained under pressure by the system which feeds the carburetor when the motor rotates. The second reservoir 11' is provided with control means, for example, a flot 170 which acts on a valve not illustrated, which controls the filling of the reservoir 11', with a predetermined quantity of fuel.

Two valves 21 and 23 feed the compartment B of the carburation chamber 7 and distribute the fuel from the reservoir 11, while the valve 171, feeds the fuel into the compartment A from the reservoir 11'.

On starting, the valve 171 ensures a flow of fuel under the effect of the partial vacuum which is exerted by the cylinders of the motor on the carburation chamber 7, according to the principle of a traditional carburetor, and as soon as the motor rotates and the system for feeding the carburetor establishes a pressure in the reservoir 11, the valves 21 and 23 enter into operation, to distribute the fuel by injection.

The valve 171 being provided to have an intermittent function is provided with control means enabling to vary the flow of fuel. The valve 171 is only in operation to facilitate the starting, or if required, until the heat exchanger which is used becomes functional. Thereafter, only the valves 21 and 23 will remain in operation by supplying the fuel for any operating condition of the motor.

Other known elements of the traditional carburation system could be used to complete the operation of the valve 171, while the operation of the injection system is the same as the one which has been described previously hereinabove.

Many modifications can obviously be made to the specific embodiment described above, by way of example only, without departing from the spirit of the invention which should only be restricted by the annexed claims.

I claim:

1. A carburation system for internal combustion motor, operating with a mixture of fuel vapor and air, said system being provided with a carburetor having at least one carburation chamber and means to control admission of air, said system comprising:

means to feed said carburetor under constant pressure through a regulator, said regulator being provided with control means to regulate the pressure of fuel, depending on the conditions of operation and behavior of the engine;

at least one variable fuel flow valve feeding the carburation chamber, and supplying the fuel for each operating condition of the engine, so that for a given pressure set by the pressure regulator, the flow of fuel is regulated by adjusting the opening of said valve;

means provided to cut the flow of fuel during a deceleration, until the RPM of the engine is close to the number of rotations for idling;

a device automatically adjusting the means to control the admission of air with respect to the opening of the variable fuel flow valve in order that for a given pressure of fuel, said device ensures a flow with the same volume ratio of fuel and air for any stable operating condition of the motor;

an intermittent valve feeding the carburation chamber under the effect of the partial vacuum which is produced by the cylinders of the motor, said valve being controlled and supplying the fuel to ease the start of the engine;

a heat exchanger utilizing the heat produced by combustion, said heat exchanger being provided to convert into vapor the fuel fed by the valves, and a non-heated passage connecting the carburation chamber to the motor cylinders;

means to limit the proportion of the quantity of air which accompanies the formation of vapors of fuel in the heat exchanger;

and means enabling a flow of a larger amount of fuel when the motor is cold and until the motor becomes hot, when said heat exchanger then becomes functional.

2. A system according to claim 1, wherein the carburetor, when the motor is started, ensures a flow of fuel resulting from the partial vacuum which is produced by the motor cylinders on the carburation chamber, and as soon as the motor starts to rotate, and when a constant pressure of fuel is established, other valves enter into operation to distribute the fuel by controlled injection.

3. A system according to claim 2, wherein the flow of fuel which is injected is regulated by adjusting the opening of valves depending on a fixed pressure of fuel and vice versa, with respect to a given opening of the valves, the flow of fuel being also regulated by means of a pressure regulator.

4. A system according to claim 1, wherein:

the carburetor is provided with two fuel reservoirs, the first of the two reservoirs is maintained under pressure when the motor rotates, the second fuel reservoir is provided with control means enabling it to be filled with only a predetermined quantity of fuel;

at least one variable fuel flow valve feeding the carburation chamber from the reservoir which is maintained under pressure;

an intermittent controlled valve feeding the carburation chamber from said second fuel reservoir, said valve supplying the fuel under the partial vacuum which is exerted by the motor cylinders on the carburation chamber.

5. A system according to claim 1, wherein:

the carburation chamber is divided below the means to control the admission of air, thus defining a first and a second compartment, which are independent of one another;

said variable fuel flow valve feeding the first compartment of the carburation chamber, thus distributing the fuel by controlled injection;

said intermittent valve feeding the second compartment of the carburation chamber, and supplying said fuel under the partial vacuum which is produced by the cylinders of the motor;

the heat exchanger mounted downstream of said carburetor being formed with a body having a heat exchange duct, connecting the first compartment of said carburation chamber to the cylinders of the motor;

the non-heated passage connecting the second compartment of the carburation chamber to the cylinders of the motor.

6. A carburetion system for internal combustion motor operating with a mixture of fuel and air, said carburetion system comprising:

a carburetor having at least one carburetion chamber into which fuel is injected under pressure;

a heat exchanger below said carburetor being incorporated in an admission system and in an exhaust system to heat the fuel with exhaust gases, in order to enable the fuel supplied by the carburetor to evaporate in said heat exchanger during its passage therein towards motor cylinders;

means for feeding into said carburetor fuel under constant pressure through a controlled pressure regulator said pressure regulator enabling to vary the pressure of fuel depending on the operating conditions and the behaviour of the engine;

at least one variable fuel flow valve feeding fuel into said carburetion chamber to supply the fuel required for all operating conditions of the motor, the quantity of fuel injected into the carburetion chamber being regulated by adjusting opening of said valve and by means of said pressure regulator;

means supplying a larger quantity of fuel to help in starting the motor until said heat exchanger is sufficiently hot to be operative, a non heated passage connecting, the carburetion chamber to the motor cylinders;

control means to regulate the proportion of air associated with vapor fuel in said heat exchanger with respect to said non heated air which is directly fed towards the motor cylinders, in order to limit the extent of premature dilatation of the combustible mixture which is introduced into the motor cylinders;

means to provide air fuel mixtures under ideal volume ratios for any operating conditions of the motor;

control means to shut off the flow of fuel injected by the variable fuel flow valve into the carburetion when slowing down until the r.p.m. is stabilized.

* * * * *